United States Patent [19]
Turner

[11] Patent Number: 5,335,175
[45] Date of Patent: Aug. 2, 1994

[54] PROPELLER CONTROL SYSTEM

[76] Inventor: Gilbert A. Turner, 27 Great Norwood St., Cheltenham, Glos., GL50 2AW, Great Britain

[21] Appl. No.: 847,007
[22] PCT Filed: Aug. 9, 1991
[86] PCT No.: PCT/GB91/01361
  § 371 Date: May 27, 1992
  § 102(e) Date: May 27, 1992
[87] PCT Pub. No.: WO92/02411
  PCT Pub. Date: Feb. 20, 1992

[30] Foreign Application Priority Data
Aug. 10, 1990 [GB] United Kingdom ............ 9017598

[51] Int. Cl.$^5$ ............................................. B64C 11/50
[52] U.S. Cl. ......................... 364/424.01; 364/431.01; 364/431.08; 416/27; 416/33; 416/44; 416/34
[58] Field of Search ............. 364/424.01, 424.06, 364/431.01, 431.08; 361/242, 244; 340/968, 964; 244/92; 416/25, 27, 30, 33, 34, 35, 44, 37

[56] References Cited
U.S. PATENT DOCUMENTS

| | | | |
|---|---|---|---|
| 4,653,981 | 3/1987 | Harner et al. | 416/34 |
| 4,928,241 | 5/1990 | Day | 364/424.01 |
| 4,934,825 | 6/1990 | Martin | 364/431.01 |
| 4,958,289 | 9/1990 | Sum et al. | 364/431.01 |
| 5,027,277 | 6/1991 | Schneider | 364/431.01 |
| 5,042,965 | 8/1991 | Niessen | 416/34 |
| 5,093,791 | 3/1992 | Schneider et al. | 364/431.01 |
| 5,150,855 | 9/1992 | Kaptein | 244/1 N |
| 5,170,365 | 12/1992 | Collopy et al. | 364/565 |

FOREIGN PATENT DOCUMENTS 0008584 3/1980 European Pat. Off. .
2211635 7/1989 United Kingdom .

Primary Examiner—Thomas G. Black
Assistant Examiner—Julie D. Day
Attorney, Agent, or Firm—Young & Thompson

[57] ABSTRACT

A propeller control system comprises a phase controller (11) having a phase control gain to control a propeller phase relationship, free air turbulence detection means (7, 9) and a gain controller (8) for varying the phase control gain in response to detected free air turbulence such that in the presence of turbulence a low gain is selected and in the absence of turbulence a high gain is selected. By varying the gain in this way the sensitivity of the phase controller (11) is reduced during turbulent conditions preventing excessive phase changes by the controller (11) striving to follow a turbulent master propeller. Similarly a speed controller (14) has its gain set by a gain controller (17) according to the degree of turbulence detected.

5 Claims, 2 Drawing Sheets

PROPELLER CONTROL SYSTEM

BACKGROUND OF THE INVENTION

This invention relates to a propeller control system, and, in particular, a propeller control system for use in circumstances of high free air turbulence.

It should be noted that air turbulence buffeting the propellers of an aircraft cause fluctuations in the rotational speed of the propellers. In the case where localised turbulence is experienced the rotational speed of the propellers may vary. Therefore, in the case where the aircraft has two or more propellers which are synchrophased localised turbulence can cause the synchrophasing to be out of alignment.

In an attempt to counteract the effects of this on the performance of the aircraft, the speed and phase control system of an aircraft are set up so that they can tolerate the effects of the turbulence. In particular the gain or sensitivity of the speed or phase control system is set at a lower level than would otherwise be desirable in order to accommodate turbulent conditions.

SUMMARY OF THE INVENTION

According to the invention there is provided a propeller control system for use with an aircraft having two or more propellers comprising a propeller controller having a control gain to control a propeller relationship, a free air turbulence detection means and a gain controller for varying the control gain in response to detected free air turbulence such that in the presence of turbulence a low gain is selected and in the absence of turbulence a high gain is selected.

Thus a compromise value for the control gains need not be chosen for the gains are set according to the prevailing degree of turbulence and can be varied as the conditions change so that the control gains are always at the optimum values.

The relationship controlled may be a phase or speed relationship.

The propeller controller may act to vary the speed and/or phase of the propeller.

The means for detecting the presence of free air turbulence may detect turbulence by monitoring the electronic propeller controllers ability to hold the propellers phase and/or speed. This can be achieved by a simple check of the achieved speed and/or phase against the desired speed and/or phase, or a Performance Index. (For a description of a Performance Index refer to Richard C. Dorf "Modern Control Systems" Addison, Wesley Third Edition).

In performing the check mentioned above the Integral of Absolute Error (IAE), the Integral of Time multiplied by Absolute Error (ITAE) or similar standard measures of the Performance Index may be utilized to perform a comparison against predetermined turbulence thresholds. Turbulent conditions are present when the Performance Index crosses a threshold value.

Alternatively, turbulence may be detected using accelerometers or other detectors.

A propeller control system made in accordance with the present invention can be used with propeller systems in which the synchrophasing is achieved using a master/slave arrangement or a Master Clock arrangement or any other arrangement.

In the case where a master/slave arrangement is used for the synchrophasing, preferably turbulence detection operates on the signal from the master propeller controller.

It has been demonstrated that a controller in a master/slave configuration will produce only a slow phase drift with the phase control inhibited during turbulent conditions. This is preferable to the excessive phase changes produced by a controller attempting to follow a turbulent master propeller.

BRIEF DESCRIPTION OF THE DRAWINGS

A specific embodiment of the invention will now be described, by way of example only, with reference to the drawing in which.

DETAILED DESCRIPTION OF THE PREFERRED EMBODIMENTS

Figure 1:
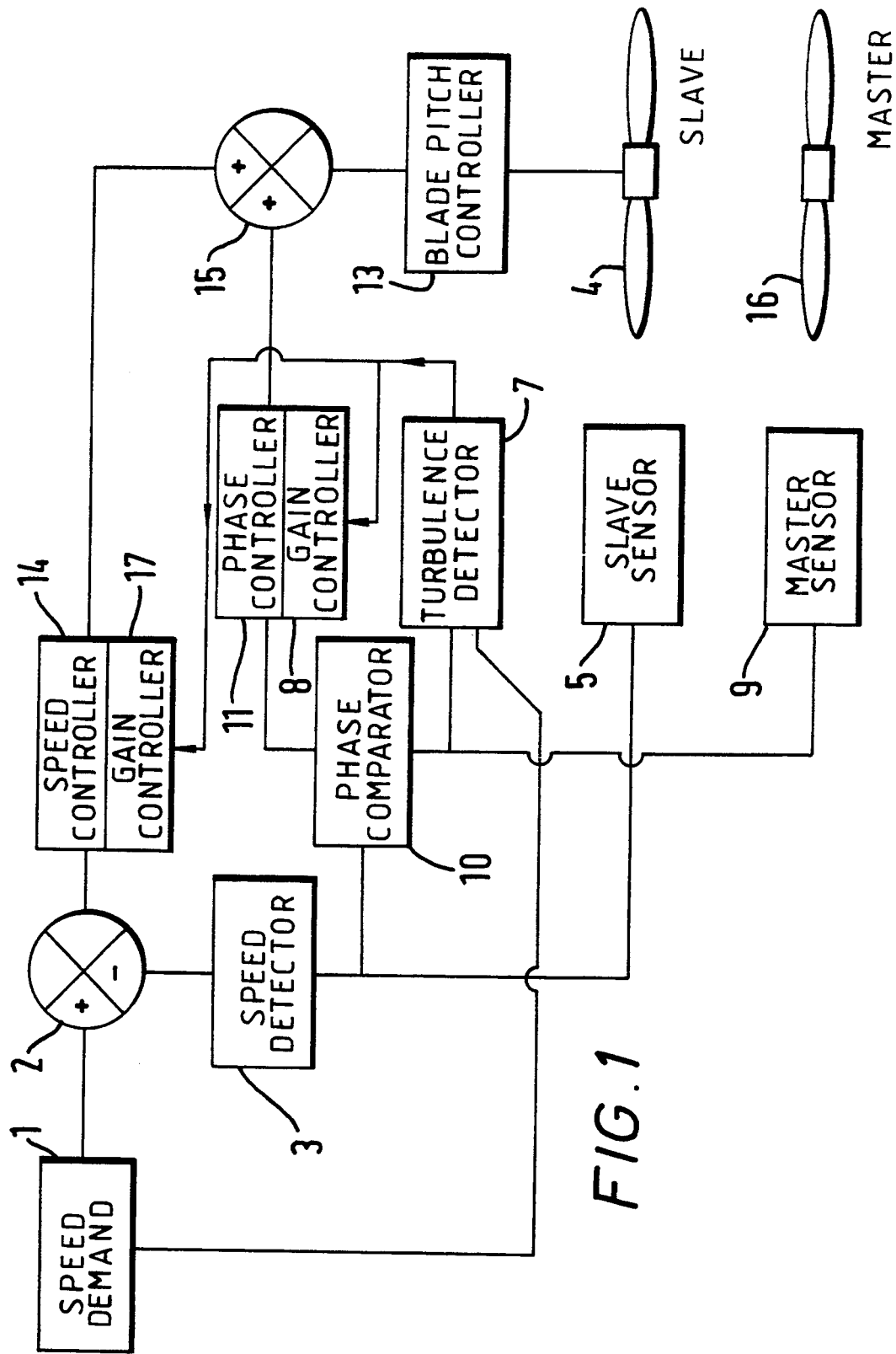
FIG. 1 shows, schematically, a propeller control system in accordance with the invention.
Figure 2:
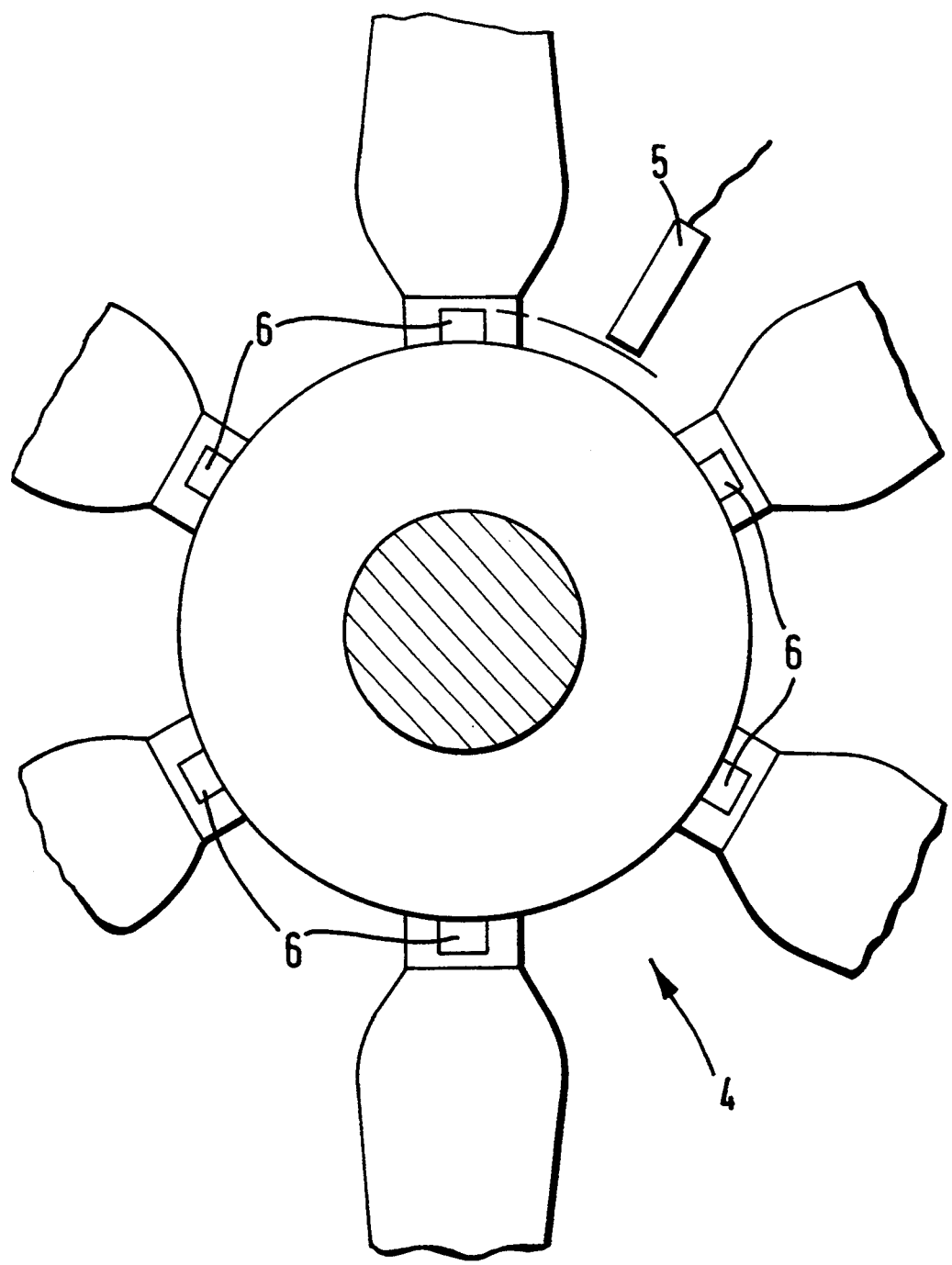
FIG. 2 is a rear view of a propeller controlled by the system shown in FIG. 1.

With reference to FIGS. 1 and 2, a propeller control system, for controlling a pair of propellers in a master slave arrangement where the slave propeller is to maintain a phase relationship with the master propeller, comprises a speed demand 1 which is derived from push button controls selected by the pilot which offer take-off, climbing, cruising settings for the speed of rotation of the propeller. The set speed is input into a summing device 2.

A speed detector 3 determines the actual speed of a slave propeller 4 from an output of a slave sensor 5 which detects the passing of metallic strikers 6 as the propeller 4 rotates. The slave sensor 5 produces a magnetic field which is disturbed by the strikers 6. A pulsed output results, six pulses being equivalent to one revolution of the propeller 4. The speed detector 3 determines the speed of the slave propeller 4 from the pulse rate and produces an output which is summed by the summer 2 to produce an error signal representing the error between the set speed and the actual speed.

The error signal is passed to a speed controller 14 which produces a signal to increase or decrease the speed of the slave propeller 4 to reduce the error. This is passed via summing device 15 to a blade pitch controller 13 which adjusts the pitch of the propeller blades and so adjusts the speed of the slave propeller 4.

A turbulence detector 7 compares the speed set by the speed demand 1 with that sensed by the master sensor 9 and produces a performance index.

If the Performance Index exceeds that which would occur due to inertia of the system, or other system factors, turbulence is determined as being present. The turbulence detector 7 produces a signal representative of the magnitude of turbulence present which is input into a gain controller 8 of the phase controller 11 and a gain controller 17 of the speed controller 14.

A master sensor 9, identical to the slave sensor 5, produces a pulsed output representative of the rate of rotation of a master propeller 16. This output is compared by a phase comparitor 10 with that derived from the slave sensor 5 to determine the actual phase difference of the propellers with a preset desired synchrophase phase angle. The phase comparitor 10 passes an error signal to a phase controller 11 which varies the pitch of the slave propeller blades via summing device 15 and blade pitch change mechanism 13. Where the slave propeller 4 is detected as having too large a phase difference with respect to the master propeller 16, the blade pitch will be reduced allowing the slave propeller 4 to speed up and advance until the correct phase relationship is achieved. Conversely, where the phase difference is too small, the pitch will be increased to slow the propeller retarding it with respect to the master propeller 16 until the phase relationship is correct once again.

The sensitivity of the system is governed by the gain of the phase controller 11, which in turn is controlled by the gain controller 8, and the gain of the speed controller 14 set by the gain controller 17. With a high gain, the slave propeller 4 is made to maintain phase relationship with the master propeller 16 even if the phase difference is small. With a low gain small phase differences have a reduced effect. The response to speed errors is similarly governed.

When the prevailing flight conditions are non-turbulent the master propeller 16 maintains a speed close to that set by the speed demand 1. Hence, the speed error determined by the turbulence detector 7 generates a Performance Index indicative of turbulence free conditions. The gain controllers 8 and 17 accordingly set the gains of the phase controller 11 and speed controller 14 to high gains. Small deviations of phase detected by the phase comparitor 10 and speed detected by speed controller 14 are thus rapidly corrected for via the pitch change mechanism 13.

If the level of turbulence is sufficient to significantly vary the speed of the master propeller 16, the speed error signal will be attributed by the turbulence detector 7 as indicating the presence of turbulent conditions. Accordingly, the gain controllers 8 and 17 will set the gain of the phase controller 11 and the speed controller 14 to a low value reducing the sensitivity of the system to small changes in the phase relationship. In severe turbulence the gains will be set to such a value that the controllers are unresponsive to changes.

I claim:

1. A propeller control system for use with an aircraft having at least two propellers, said control system comprising propeller movement monitor means to monitor relative movement between said propellers and to produce a corresponding error signal; a propeller controller that receives said error signal as an input and produces a corresponding output control signal to control the relative movement between said propellers, the propeller controller having a variable gain function that operates on said input error signal with a variable gain value to produce said output control signal; free air turbulence monitor means that monitors free air turbulence in the region of said propellers and produces a corresponding free air turbulence signal; and a gain controller that varies the gain value used in the propeller controller in response to the free air turbulence signal so that in the presence of turbulence a low gain value is used and in the absence of turbulence a high gain value is used.

2. A system as claimed in claim 1, in which the gain controller varies the gain value used in the propeller controller in the presence of turbulence so as to reduce the gain value with increasing turbulence.

3. A system as claimed in claim 1, in which the free air turbulence monitor means comprises detection means to determine the actual speed of at least one of the propellers; comparison means to compare the actual speed with a desired speed of said at least one propeller and to produce a speed error signal corresponding to the difference between the actual speed and the desired speed; and processing means that receives the speed error signal as an input and produces said free air turbulence signal as an output after processing in accordance with predetermined relationships.

4. A system as claimed in claim 3, in which said processing means processes the speed error signal in accordance with a stored algorithm to reduce said free air turbulence signal.

5. A method of controlling propellers of an aircraft, comprising monitoring relative movement between two propellers to produce an error signal; processing said error signal using a gain function to produce a control signal to control the relative movement between said two propellers; monitoring free air turbulence in the region of said propellers to produce a corresponding free air turbulence signal; and varying a gain value of the gain function responsive to the free air turbulence signal so that in the presence of turbulence a low gain value is used and in the absence of turbulence a high gain value is used.

* * * * *